United States Patent
Wong et al.

(10) Patent No.: US 9,622,241 B2
(45) Date of Patent: Apr. 11, 2017

(54) METHOD AND APPARATUS FOR PREVENTING MESSAGE COLLISION

(71) Applicant: Alcatel Lucent, Boulogne-Billancourt (FR)

(72) Inventors: Shin Horng Wong, Chippenham (GB); Matthew Baker, Canterbury (GB); Sigen Ye, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 22 days.

(21) Appl. No.: 14/497,661

(22) Filed: Sep. 26, 2014

(65) Prior Publication Data

US 2016/0095111 A1    Mar. 31, 2016

(51) Int. Cl.
*H04Q 7/00* (2006.01)
*H04W 72/04* (2009.01)
*H04W 4/00* (2009.01)
*H04L 5/00* (2006.01)

(52) U.S. Cl.
CPC ....... *H04W 72/0446* (2013.01); *H04L 5/0053* (2013.01); *H04W 4/005* (2013.01); *H04W 72/048* (2013.01)

(58) Field of Classification Search
CPC  H04W 72/0446; H04W 4/005; H04W 72/048
USPC .................. 370/336, 329, 330, 328
See application file for complete search history.

(56) References Cited

U.S. PATENT DOCUMENTS

| | | | | |
|---|---|---|---|---|
| 8,483,294 B2 * | 7/2013 | Cho | ...................... | H04L 1/0042 370/464 |
| 8,681,678 B2 * | 3/2014 | Koo | ...................... | H04L 5/0037 370/310 |
| 8,811,298 B2 * | 8/2014 | Gaal | ...................... | H04W 28/26 370/280 |
| 2009/0265599 A1* | 10/2009 | Chae | ...................... | H04L 1/1812 714/749 |
| 2010/0040009 A1* | 2/2010 | Gaal | ...................... | H04W 28/26 370/329 |
| 2011/0058512 A1* | 3/2011 | Koo | ...................... | H04L 5/0037 370/312 |
| 2011/0080903 A1 | 4/2011 | Yin et al. | | |

(Continued)

FOREIGN PATENT DOCUMENTS

| | | |
|---|---|---|
| WO | WO-2013167967 A2 | 11/2013 |
| WO | WO-2014124667 A1 | 8/2014 |
| WO | WO-2014130082 A1 | 8/2014 |

OTHER PUBLICATIONS

Vodafone: "Summary of LC_MTC_LTE agreements after RAN1#77", 3GPP Draft; R1-172760; vol. RAN WG1, No. Seoul, Korea; May 19, 2014-May 23, 2014, May 27, 2014 (May 27, 2014), XP050815114, Retrieved from the Internet <URL:http://www.3gpp.org/ftp/tsg_ranWG1_RL1/TSGR1_77/Docs/> [retrieved on May 27, 2014].

*Primary Examiner* — Chuong T Ho (74) *Attorney, Agent, or Firm* — Harness, Dickey & Pierce, P.L.C.

(57) ABSTRACT

In one embodiment, the method includes performing symbol to resource element mapping such that mapping for a first message configured to use a first amount of transmission resource differs from mapping for a second message configured to use a second amount of transmission resource by a mapping offset of a number of resource units, and the first amount being different than the second amount.

12 Claims, 7 Drawing Sheets

(56) References Cited

U.S. PATENT DOCUMENTS

| | | | |
|---|---|---|---|
| 2011/0261774 A1* | 10/2011 | Lunttila | H04L 5/0007 370/329 |
| 2012/0063413 A1 | 3/2012 | Kroener et al. | |
| 2013/0033998 A1* | 2/2013 | Seo | H04W 24/00 370/252 |
| 2014/0219210 A1* | 8/2014 | Lunttila | H04L 5/0007 370/329 |
| 2014/0241150 A1 | 8/2014 | Ng et al. | |
| 2015/0078348 A1* | 3/2015 | Han | H04W 28/0242 370/336 |

* cited by examiner

METHOD AND APPARATUS FOR PREVENTING MESSAGE COLLISION

BACKGROUND OF THE INVENTION

Generally, a Machine Type Communication (MTC) device is a user equipment (UE) that is used by a machine for a specific application. An example of an MTC device is a smart meter. Some of these smart meters are located in basements, which suffer from high penetration loss and therefore it is difficult for the MTC device to communicate with the network.

Repetition of physical channels is the main mechanism to extend the coverage of MTC UEs. The number of repetitions are expected to be significant (i.e., possibly hundreds of repetitions). Repetitions would reduce spectral efficiency and due to this, several coverage levels have been suggested such that UEs at a lower coverage level (i.e., closer to a base station or ehanced NodeB (eNB)) would require less repetitions compared to those that are at a higher coverage level. Improvement to the spectral efficiency is therefore highly beneficial.

SUMMARY OF THE INVENTION

At least one embodiment relates to a method for preventing message collision between two message configured to use different amounts of transmission resource.

In one embodiment, the method includes performing symbol to resource element mapping such that mapping for a first message configured to use a first amount of transmission resource differs from mapping for a second message configured to use a second amount of transmission resource by a mapping offset of a number of resource units, and the first amount being different than the second amount.

The resource units may be at at least one of resource elements, symbols and subframes.

In one embodiment, the method includes transmitting the first and second messages such that a start time of the first message is offset in time from a start time of the second message.

At least one embodiment is directed to an apparatus for preventing message collision between two message configured to use different amounts of transmission resource.

In one embodiment, the apparatus includes a processor configured to perform symbol to resource element mapping such that mapping for a first message configured to us a first amount of transmission resource differs from mapping for a second message configured to use a second amount of transmission resource by a mapping offset of a number of resource units, and the first amount being different than the second amount.

At least one embodiment is directed to a non-transitory computer readable medium.

In one embodiment, the non-transitory computer readable medium stores a program that when executed by a processor configures a processor to perform symbol to resource element mapping such that mapping for a first message configured to us a first amount of transmission resource differs from mapping for a second message configured to use a second amount of transmission resource by a mapping offset of a number of resource units, and the first amount being different than the second amount.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" may be synonymous to a mobile user, mobile station, mobile terminal, terminal, user, subscriber, wireless terminal, and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs (eNodeB or eNBs), access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Figure 1:
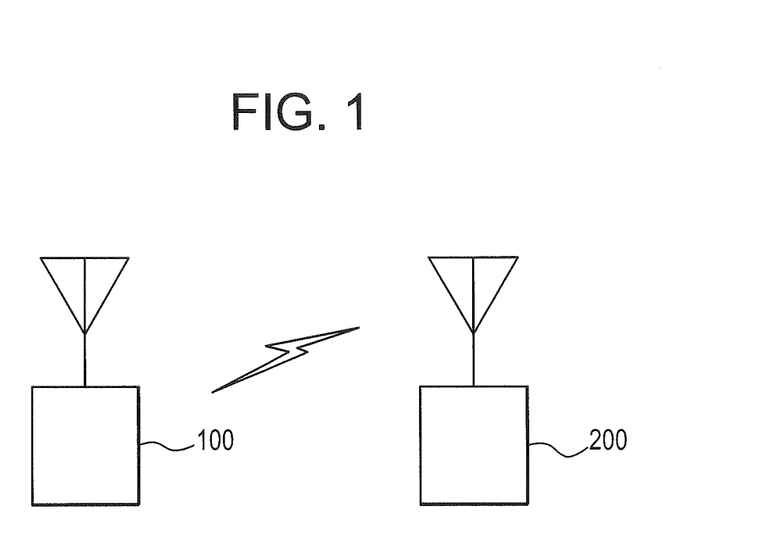
FIG. 1 illustrates wireless communication according to an example embodiment.

FIG. 1 illustrates wireless communication according to an example embodiment. As shown, a first device 100 communicates wirelessly with a second device 200. For example, in a wireless network, the first device 100 may be a base station or eNB and the second device 200 may be a UE. And while example embodiments will be described using this example, the present invention is not limited to this example.

Figure 2:
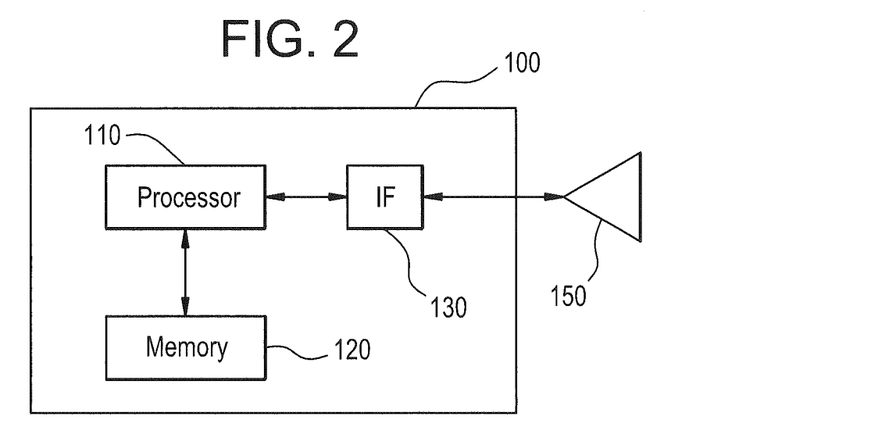
FIG. 2 illustrates one example of the eNB in FIG. 1 according to an example embodiment.

FIG. 2 illustrates one example of the eNB100. As shown, the eNB 100 includes a processor 110, connected to a memory 120, various interfaces 130, and an antenna 150. As will be appreciated, depending on the implementation of the eNB 100, the eNB 100 may include many more components than those shown in FIG. 2. However, it is not necessary that all of these generally conventional components be shown in order to disclose the illustrative embodiment.

Memory 120 may be a computer readable storage medium that generally includes a random access memory (RAM), read only memory (ROM), and/or a permanent mass storage device, such as a disk drive. Memory 120 also stores operating system and any other routines/modules/applications for providing the functionalities of the eNB 100 (e.g., functionalities of a base station, methods according to the example embodiments, etc.). These software components may also be loaded from a separate computer readable storage medium into memory 120 using a drive mechanism (not shown). Such separate computer readable storage medium may include a disc, tape, DVD/CD-ROM drive, memory card, or other like computer readable storage medium (not shown). In some embodiments, software components may be loaded into memory 120 via one of the various interfaces 130, rather than via a computer readable storage medium.

Processor 110 may be configured to carry out instructions of a computer program by performing the basic arithmetical, logical, and input/output operations of the system. Instructions may be provided to processor 110 by memory 120.

The various interfaces 130 may include components that interface the processor 110 with an antenna 150, or other input/output components. As will be understood, the interfaces 130 and programs stored in the memory 120 to set forth the special purpose functionalities of the eNB 100 will vary depending on the implementation of the first device.

Figure 3:
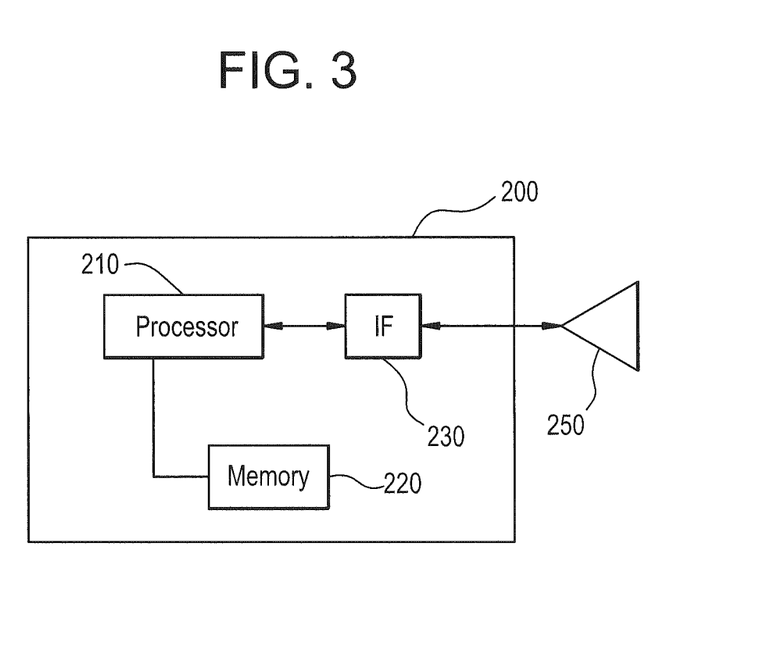
FIG. 3 illustrates an example of the UE in FIG. 1 according to an example embodiment.

FIG. 3 illustrates one example of the UE 200. As shown, the UE 200 includes a processor 210, connected to a memory 220, various interfaces 230, and an antenna 250. As will be appreciated, depending on the implementation of the UE 200, the UE 200 may include many more components than those shown in FIG. 3. However, it is not necessary that all of these generally conventional components be shown in order to disclose the illustrative embodiment.

Memory 220 may be a computer readable storage medium that generally includes a random access memory (RAM), read only memory (ROM), and/or a permanent mass storage device, such as a disk drive. Memory 220 also stores operating system and any other routines/modules/applications for providing the functionalities of the UE 200 (e.g., functionalities of a UE, methods according to the example embodiments, etc.). These software components may also be loaded from a separate computer readable storage medium into memory 220 using a drive mechanism (not shown). Such separate computer readable storage medium may include a disc, tape, DVD/CD-ROM drive, memory card, or other like computer readable storage medium (not shown). In some embodiments, software components may be loaded into memory 220 via one of the various interfaces 230, rather than via a computer readable storage medium.

Processor 210 may be configured to carry out instructions of a computer program by performing the basic arithmetical, logical, and input/output operations of the system. Instructions may be provided to processor 210 by memory 220.

The various interfaces 230 may include components that interface the processor 210 with an antenna 250, or other input/output components. As will be understood, the interfaces 230 and programs stored in the memory 220 to set forth the special purpose functionalities of the UE 200 will vary depending on the implementation of the first device.

For the purposes of explanation only, the embodiments will be described with respect to the Long Term Evolution (LTE) standard. Accordingly, the well-known terminology associated with LTE will be used describing the embodiments. For example, as is well known, a resource element (RE) is the minimum resource unit in LTE, indicated by one orthogonal frequency-division multiplexing (OFDM) symbol in time domain and one subcarrier in frequency domain. A resource element group (REG) contains 4 consecutive REs (or 4 REs separated by a cell-specific Reference Signal (RS)) within the same OFDM symbol and the same resource block. A control channel element (CCE) contains 9 REGs, which are distributed across the OFDM symbols and the system bandwidth through interleaving to enable diversity and to mitigate interference. The physical downlink control channel (PDCCH) is built using these blocks. The number of CCEs in a PDCCH is called its CCE aggregation level or aggregation level (AL) for short, and may be 1, 2, 4, or 8 consecutive CCEs (logical sequence).

Next, operation according to an example embodiment will be described.

In current wireless networks the physical downlink control channel ((E)PDCCH) contains repetition within a subframe in the form of Aggregation Level (AL). NOTE (E)PDCCH is meant to refer to any form of the downlink control channel, i.e. enhanced PDCCH (EPDCCH) and PDCCH. The UE 200 is expected to blindly detect the AL by conducting multiple decoding trials with different ALs and different time-frequency locations in a subframe. As an example, the UE 200 may receive a downlink control channel message in any of 6 time-frequency locations at AU (i.e., 1 channel control element (CCE)), 6 locations at AL2, 6 locations at AL4 and 4 locations at AL8, and with either of two different message sizes in each case, making a total of 44 candidates comprising the "search space".

For coverage enhancement, in addition to the existing repetition within a subframe, i.e., AL, (E)PDCCH is also repeated in the time domain using multiple subframes. In this document repetition $R_T$ will be referred to as repetition in the time domain and AL will be referred to as repetition within a subframe. The total number of (E)CCE (CCE or ECCE) of the (E)PDCCH message, known as the Total Aggregated Resource (TAR), is:

$$\text{TAR} = R_T \times \text{AL} \quad (1)$$

Accordingly, TAR represents the amount of transmission resource for a message.

If the number of repetitions is fixed and the search space candidate of a given downlink control channel message is the same in every subframe in which the message is repeated, then the total number of candidates that the UE 200 is required to blind decode remains the same as if no repetition were used. However, if multiple candidates for the number of repetitions existed, the number of repetitions would not be known a priori by the UE 200. That is, the UE 200 may be required to blind detect the number of repetitions in addition to the AL and message size. In this case, the TAR value used by the eNB 100 for a specific UE 200 can depend on that UE's required coverage level and also the message size. Hence, in addition to variable AL & repetition, there may be several TAR values that the UE 200 needs to blind decode for.

Figure 4:
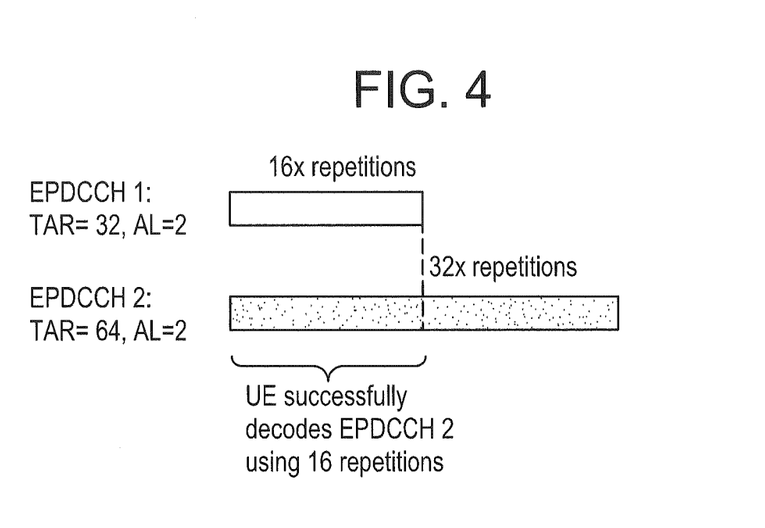
FIG. 4 illustrates an example of two possible TAR values to decode for at AL=2, i.e., TAR=32 or 64 and therefore at the same AL, there will be different repetitions for the different TAR.

Given variable repetitions and multiple TAR values, it is possible for a UE 200 to mistake an (E)PDCCH transmission with a high repetition level for one that has a shorter repetition. For example in FIG. 4, a UE has two possible TAR values to decode for at AL=2, i.e., TAR=32 or 64 and therefore at the same AL, there will be different repetitions for the different TAR. In FIG. 4, we consider the candidates with AL=2 and here for TAR=32, the number of repetitions is 16 whilst for TAR=64, the number of repetitions is 32. Within each coverage level, due to channel variation it is possible that the UE 200 can finish decoding a message with lesser number of repetitions. In FIG. 4, the UE may be decoding the repetitions for EPDCCH 2, which has TAR=64 at AL=2; and it is able to decode this message using lesser number of repetitions, i.e., in this example, it requires only 16 repetitions. The UE 200 may wrongly assume that the decoded message is for EPDCCH 1 which has TAR=32 at AL=2. It is agreed that the PDSCH corresponding to an (E)PDCCH would start after the end of the (E)PDCCH repetition and in FIG. 4, the UE 200 would get the wrong starting subframe for the PDSCH repetition.

Figure 5:
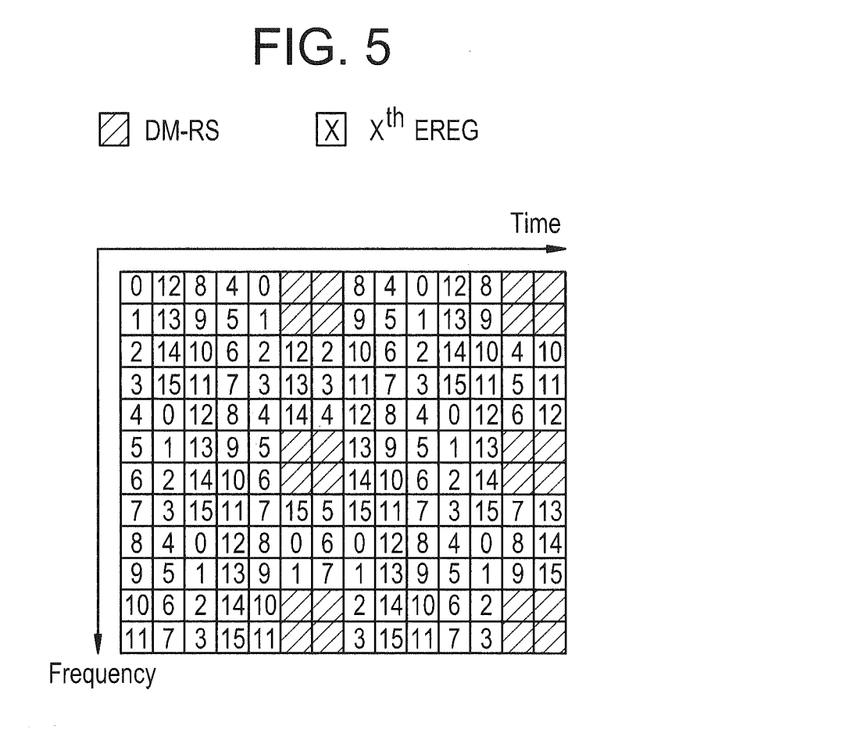
FIG. 5 shows RE of a physical resource block (PRB) containing the enhanced resource element group (EREG) of an EPDCCH.
Figure 6:
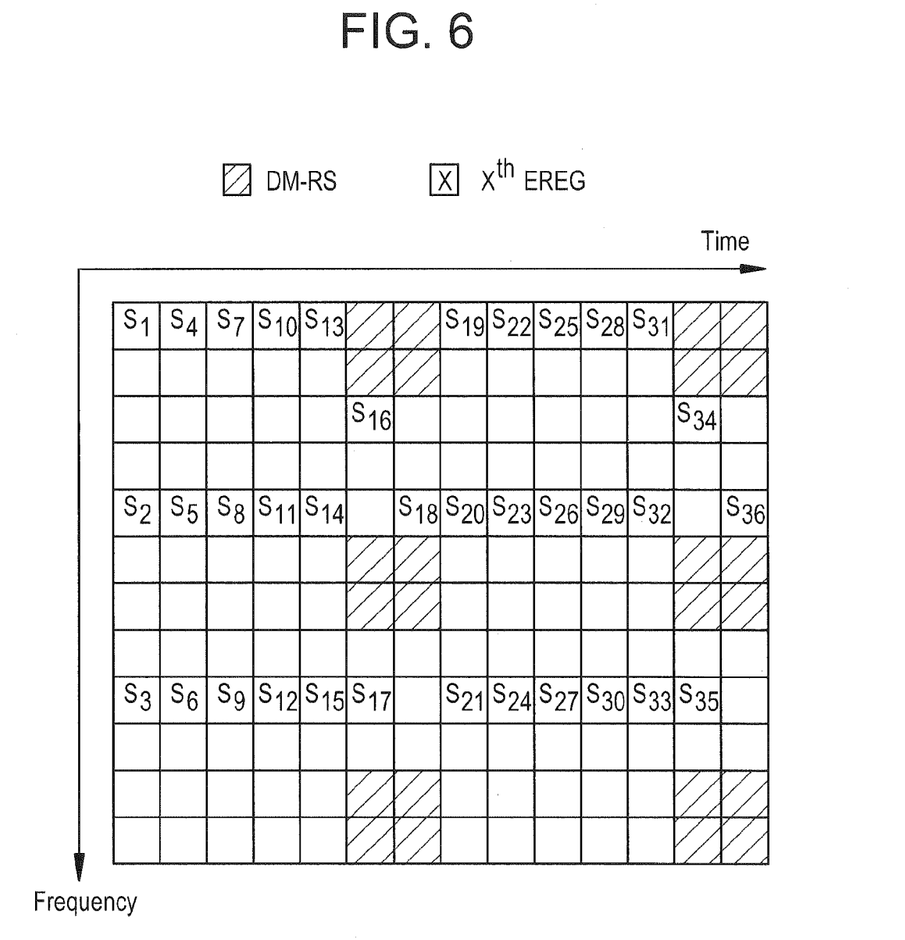
FIG. 6 illustrates a conventional frequency first mapping of symbols to resource elements (S2RE).
Figure 7:
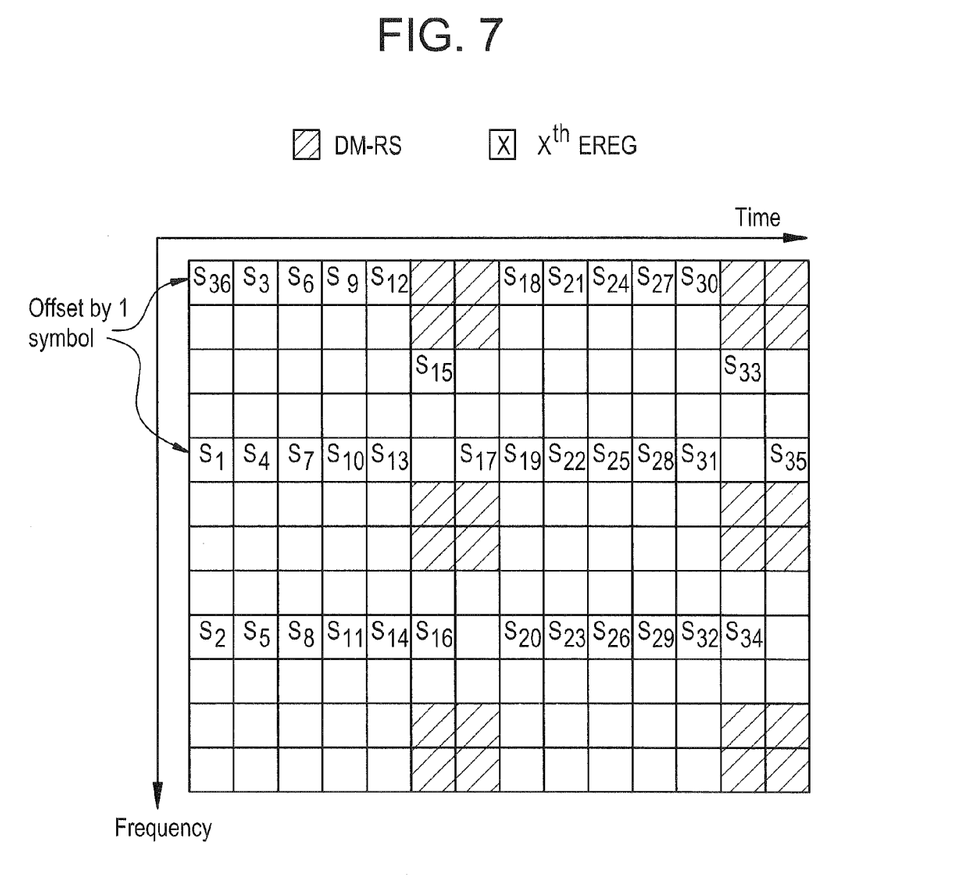
FIG. 7 illustrates an example of S2RE according to an example embodiment.

According to an example embodiment, the eNB 100 uses a different symbol to resource element (RE) mapping (S2RE) to distinguish one message of a different repetition from another. For example, FIG. 5 shows RE of a physical resource block (PRB) containing the enhanced resource element group (EREG) of an EPDCCH. Assuming an ECCE occupies EREG 2, 4, 8 and 12 and thus a message occupying this ECCE would use the RE lightly shaded in FIG. 5. Assume that the message consists of symbols {S1, S2, . . . S36} which need to be mapped to this ECCE. Currently this is done frequency first followed by time as shown in FIG. 6. An example of an offset to the S2RE, e.g. 1 symbol offset, according to an embodiment is as shown in FIG. 7. This S2RE offset can be signaled to the UE 200 or pre-defined in the specifications. It will be appreciated that the example embodiments are not limited to a 1 symbol offset.

In one embodiment, the eNB 100 uses difference S2RE offsets for (E)PDCCH messages with different TARs. For example, EPDCCH using TAR=64 can have no symbol offset whilst EPDCCH using TAR=32 have a 1 symbol offset. In this way, the issue in FIG. 4 would not happen since the UE 200 would not be able to decode EPDCCH 1 with TAR=32 from the 16 repetitive samples of EPDCCH 2.

In another embodiment, the eNB 100 uses difference S2RE offsets for (E)PDCCH messages with different numbers of repetitions.

Figure 8:
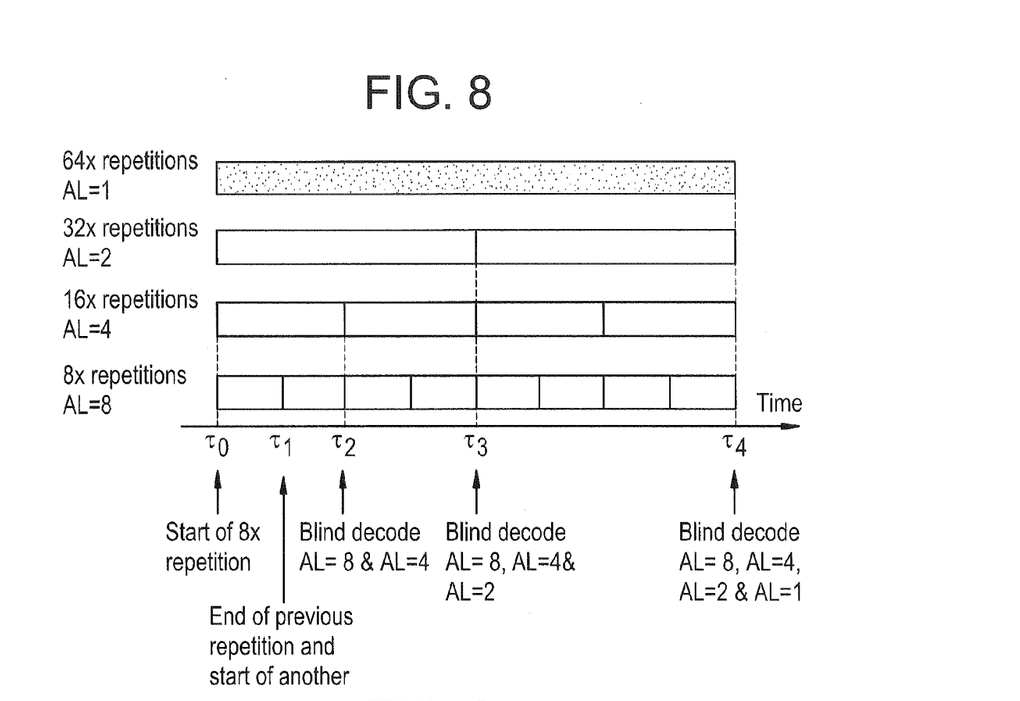
FIG. 8 illustrates the possible conventional start timings of (E)PDCCH with different AL and different repetitions, and the blind decoding timing as well.
Figure 10:
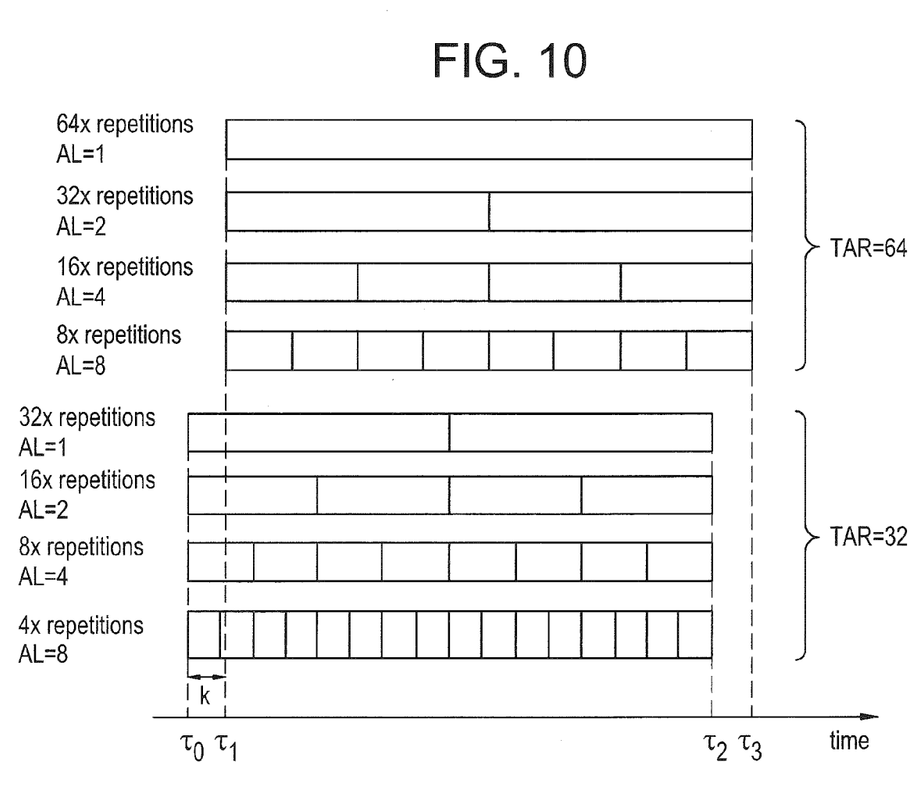
FIG. 10 illustrates an example of offsetting the start of message with different TAR in the time domain according to an example embodiment.

In another embodiment, the eNB uses difference S2RE offsets for (E)PDCCH messages with different numbers of repetitions at a given AL One method of determining the subframe in which to a repeated (E)PDCCH message may be by using the "MOD" function of the repetition, e.g., the start of (E)PDCCH repetition can occur in subframes when the following is true:

$$(10 \times SFN + NSub) MOD\ R_T = 0 \qquad (2)$$

where NSub is the subframe number in which to start the (E)DPCCH message, and SFN is the well-known system frame number. Assume the numbers of (E)PDCCH repetitions are in powers of 2, e.g. {8, 16, 32, 64}, then using Equation 2, these repetitions could start at the same time as shown in FIG. 8 at time τ0. For example, an 8× repetition transmission would start at time τ0 and end at time τ1. At time τ1 another potential (E)PDCCH transmission with 8× repetitions could start and so on. Assume that the repetitions 8, 16, 32 & 64 corresponds to AL=8, 4, 2 & 1, respectively, such that the TAR is 64 for all (E)PDCCH candidates. It is expected that the UE 200 would perform blind decoding when it has accumulated sufficient repetitive samples. The number of blind decodings performed by the UE 200 varies depending on when the repetition ends. For example in FIG. 8, at time τ1, only (E)PDCCH candidates corresponding to 8× repetitions need to be decoded, in this example only AL=8 candidates need to be blindly decoded. Similarly at τ3, candidates corresponding to 8× repetitions, 16× repetitions and 32× repetitions, i.e., AL=8, AL=4 and AL=2 candidates need to be blindly decoded. At τ4, all repetitions end at the same time and all candidates (AL=8, 4, 2 & 1) need to be blindly decoded. It should be noted that having multiple TAR values would lead to additional blind decoding for the UE, for example if we have two TAR values of 64 and 32 where the candidates can have AL={8, 4, 2 & 1} then at some point the repetitions would end at the same time where the UE 200 would have to blind decode all candidates (with different TAR values). This may effectively doubles the number of blind decodes for the UE 200. Hence, in another embodiment, the eNB100 offsets the start of an (E)PDCCH transmission in the time domain for different TAR values. This would lead to the (E)PDCCH repetition transmission of different TAR values to end at different subframes. This time offset can be signaled by the eNB100 to the UE 200 and the UE 200 can determine the start of (E)PDCCH of each TAR value using:

$$(10 \times SFN + NSub) MOD\ RT = k \qquad (3)$$

where k is the offset parameter value and different TAR have different k values. Remember, the eNB 100 solves for Nsub. NOTE: the offset parameter value k needs to be smaller than the shortest repetition. An example is shown in FIG. 10, where the repetitions for TAR=32 start at time τ0 and end at time τ3, whilst the repetitions for TAR=64 start at time τ1 and end at time τ4. Due to this time offset k, the UE 200 does not need to perform twice the number of blind decodings within a subframe. The value k of the offset parameter may a design parameter set through empirical study.

Yet another embodiment combines the different symbol to RE mapping (which doubles the number of blind decodes required for the UE 200) with a time offset for some of the candidates (which is designed to ensure that only a fraction of the blind decodes are required to be performed in any given subframe), thus ensuring that the number of blind decodes in any given subframe does not exceed the existing per-subframe blind decoding limit of, for example, 44.

In another embodiment, the eNB 100 starts the (E)PD-CCHs of different repetition levels at a different time offset, i.e., different repetition levels have different k values, and/or different repetition levels at a given AL have different k values. This is to avoid (E)PDCCH of different repetitions ending at the same time.

Figure 9:
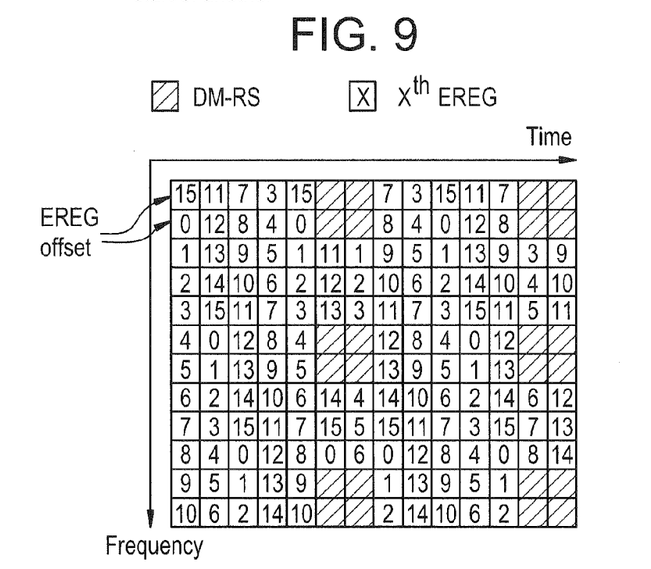
FIG. 9 illustrates an example an offset in the EREG to RE mapping according to an example embodiment.

In yet another embodiment, the eNB 110 introduces an offset to the EREG to RE mapping for (E)PDCCH of different TAR values. For example the EREG to RE mapping in FIG. 5 would be used for TAR=64 whilst the EREG to RE mapping (that has 1 RE offset) in FIG. 9 would be used for TAR=32.

In a further another embodiment, the eNB 100 introduces an offset to the EREG to RE mapping for (E)PDCCH of different repetition levels, or for different repetition levels of a given AL.

In an example, assume that the eNB 100 uses two different TAR values for EPDCCH, namely TAR=32 and 64. The possible AL={1, 2, 4, 8}. For TAR=32, the EPDCCH repetitions are 32, 16, 8 and 4 for AL=1, AL=2, AL=4 and AL=8 respectively. For TAR=64, the EPDCCH repetitions are 64, 32, 16 and 8 for AL=1, AL=2, AL=4 and AL=8 respectively.

The S2RE mapping for EPDCCH with TAR=32 has no offset, i.e., if ECCE uses EREG 0, 4, 8 & 12, the symbols are mapped according to those in FIG. 6.

The S2RE mapping for EPDCCH with TAR=64 has a 1 RE offset, i.e., if the ECCE uses EREG 0, 4, 8 & 12, the symbols are mapped according to those in FIG. 7.

The start subframe & SFN for EPDCCH with TAR=32 follows Equation 2, i.e., no time offset. The start subframe & SFN for EPDCCH with TAR=64 follows Equation 3 with k=1, i.e., 1 subframe time offset. The start and end time of EPDCCH repetitions for the two different TAR are as shown in FIG. 10.

Hence the possible candidates that the UE 200 need to blind decode for have the following characteristics (i.e., in each characteristic there may be several candidates):

TAR=32, AL=1, $R_T$=32
TAR=32, AL=2, $R_T$=16
TAR=32, AL=4, $R_T$=8
TAR=32, AL=8, $R_T$=4
TAR=64, AL=1, $R_T$=64
TAR=64, AL=2, $R_T$=32
TAR=64, AL=4, $R_T$=16
TAR=64, AL=8, $R_T$=8

Assuming the eNB 100 sends an EPDCCH to the UE 200 using TAR=64, AL=2 and $R_T$=32. As described above, the UE 200 may accumulate sufficient energy to decode the EPDCCH message using fewer repetitions, e.g., the UE 200 may have sufficient energy after accumulating 16 repetitive samples. In this case the UE 200 would try to blind decode this assuming 16 repetition at AL=2 with TAR=32. Since the S2RE mapping is different for different TAR, the UE 200 will not be successful in decoding the message and therefore the issue described with respect to FIG. 4 will be avoided.

The invention being thus described, it will be obvious that the same may be varied in many ways. Such variations are not to be regarded as a departure from the invention, and all such modifications are intended to be included within the scope of the invention.

We claim:

1. A method for preventing message collision between a first message and a second message which are configured to use different amounts of transmission resources, the method comprising:

performing a symbol to resource element mapping such that the mapping for the first message differs from the mapping for the second message by a mapping offset of a number of resource units, the first message configured to use a first amount of transmission resource, the second message configured to use a second amount of transmission resource, and the first amount of transmission resource being different from the second amount of transmission resource, and determining an offset time for transmission of the first and second message based on (i) a first number of repetitions associated with the first amount of transmission resource, (ii) a second number of repetitions associated with the second amount of transmission resource, (iii) a first offset parameter value associated with the first message, and (iv) a second offset parameter value associated with the second message, the first and second number of repetitions indicating a number of times the first and second messages are repeatedly sent over time.

2. The method of claim 1, wherein each one of the number of resource units includes at least one of resource elements, symbols and sub-frames.

3. The method of claim 2, wherein the number of resource units is one resource element.

4. The method of claim 1, wherein the number of resource units is one symbol.

5. The method of claim 1, wherein the first amount of transmission resource includes a first total aggregated resource that is different from a second total aggregated resource included in the second amount of transmission resource, the first and second total aggregated resources being based on an aggregation level and the first and second numbers of repetitions, the aggregation level indicates a number of control channel elements in a channel carrying a respective one of the first message and the second message.

6. The method of claim 1, wherein the first amount of transmission resource indicates a first aggregation level that is same as a second aggregation level indicated by the second amount of transmission resource, a respective one of the first and second aggregation levels indicates a number of control channel elements in a channel carrying a respective one of the first message and the second message.

7. The method of claim 1, further comprising:

transmitting the first and second messages such that a first start time of the first message is offset by the offset time from a second start time of the second message.

8. The method of claim 1, wherein if the first amount of transmission resource includes a first total aggregated resource that is different from a second total aggregated resource included in the second amount of transmission resource, then the first offset parameter value differs from the second offset parameter value, one of the first total aggregated resource and the second total aggregated resource being based on an aggregation level and one of the first number of repetitions and the second number of repetitions, the aggregation level indicates a number of control channel elements in a channel carrying a respective one of the first message and the second message.

9. The method of claim 1, wherein if the first number of repetitions is different from the second number of repetitions, then the first offset parameter value differs from the second offset parameter value.

10. The method of claim 1, wherein if (i) the first number of repetitions is different from the second number of repetitions and (ii) the first message indicates a first aggregation level that is same as a second aggregation level indicated by the second message, then the first offset parameter value differs from the second offset parameter value, a respective one of the first aggregation level and the second aggregation level indicates a number of control channel elements in each of the first and second amounts of transmission resources.

11. An apparatus for preventing message collision between a first message and a second message which are configured to use different amounts of transmission resource, comprising:

a memory having computer readable instructions thereon; and a processor configured to execute the computer readable instructions to, perform a symbol to resource element mapping such that the mapping for the first message differs from the mapping for the second message by a mapping offset of a number of resource units, the first message configured to use a first amount of transmission resource, the second message configured to use a second amount of transmission resource, and the first amount of transmission resource being different from the second amount of transmission resource, and determine an offset time for transmission of the first and second message based on (i) a first number of repetitions associated with the first amount of transmission resource, (ii) a second number of repetitions associated with the second amount of transmission resource, (iii) a first offset parameter value associated with the first message, and (iv) a second offset parameter value associated with the second message, the first and second number of repetitions indicating a number of times the first and second messages are repeatedly sent over time.

12. A non-transitory computer readable medium having computer readable instructions stored thereon, that when executed by a processor, configure the processor to:

perform a symbol to resource element mapping such that the mapping for a first message differs from the mapping for a second message by a mapping offset of a number of resource units, the first message configured to use a first amount of transmission resource, the second message configured to use a second amount of transmission resource, and the first amount of transmission resource being different from the second amount of transmission resource, and determine an offset time for transmission of the first and second message based on (i) a first number of repetitions associated with the first amount of transmission resource, (ii) a second number of repetitions associated with the second amount of transmission resource, (iii) a first offset parameter value associated with the first message, and (iv) a second offset parameter value associated with the second message, the first and second number of repetitions indicating a number of times the first and second messages are repeatedly sent over time.

* * * * *